United States Patent
Szapiel et al.

(10) Patent No.: US 12,386,156 B2
(45) Date of Patent: Aug. 12, 2025

(54) SYSTEM AND METHOD FOR ELECTRONIC CORRECTION OF BORESIGHT ERRORS IN VARIABLE MAGNIFICATION OPTICAL SYSTEMS

(71) Applicant: RAYTHEON CANADA LIMITED, Ottawa (CA)

(72) Inventors: Stan Szapiel, Midland (CA); Kevin B. Wagner, Midland (CA)

(73) Assignee: RAYTHEON CANADA LIMITED, Ottawa (CA)

( * ) Notice: Subject to any disclaimer, the term of this patent is extended or adjusted under 35 U.S.C. 154(b) by 616 days.

(21) Appl. No.: 17/843,416

(22) Filed: Jun. 17, 2022

(65) Prior Publication Data

US 2023/0003981 A1    Jan. 5, 2023

Related U.S. Application Data

(60) Provisional application No. 63/217,308, filed on Jul. 1, 2021.

(51) Int. Cl.
  *G02B 23/10* (2006.01)
  *G02B 15/14* (2006.01)
  (Continued)

(52) U.S. Cl.
  CPC ........... *G02B 15/14* (2013.01); *G02B 21/025* (2013.01); *G02B 23/12* (2013.01)

(58) Field of Classification Search
  CPC .................................................. G02B 23/105
  See application file for complete search history.

(56) References Cited

U.S. PATENT DOCUMENTS 5,457,310 A    10/1995    Fournier
11,178,332 B2 *  11/2021   Lund ....................... F41G 3/326
(Continued)

FOREIGN PATENT DOCUMENTS

WO    2020/096933 A1    5/2020

OTHER PUBLICATIONS

International Search Report and Written Opinion in Application No. PCT/CA2022/051045 dated Sep. 20, 2022 (9 pgs.).
(Continued)

*Primary Examiner* — Edmond C Lau
(74) *Attorney, Agent, or Firm* — NORTON ROSE FULBRIGHT CANADA LLP (57) ABSTRACT

A variable magnification optical system with boresight error correction includes a focusing lens to receive light along an optical axis of the variable magnification optical system, with the focusing lens configured to create an image of a target at a focal plane. The system includes a magnification changer disposed along the optical axis, with the magnification changer including an optomechanical drive system to adjust an optical magnification setting of one or more zoom lenses. The system also includes a light source configured to emit a pilot beam into the magnification changer. The system includes a position sensitive photodetector configured to receive the pilot beam exiting the magnification changer. The system further includes a microdisplay optically conjugate to the focal plane, with the microdisplay configured to impose an image of an electronic reticle on the focal plane based on the position of the pilot beam relative to the position sensitive photodetector.

11 Claims, 5 Drawing Sheets

(51) Int. Cl.
*G02B 21/02* (2006.01)
*G02B 23/12* (2006.01)

(56) References Cited

U.S. PATENT DOCUMENTS

| | | |
|---|---|---|
| 2004/0233420 A1 | 11/2004 | Deflumere et al. |
| 2013/0199074 A1 | 8/2013 | Paterson et al. |
| 2016/0265880 A1* | 9/2016 | Maryfield .............. G01S 7/4816 |
| 2017/0059686 A1* | 3/2017 | Kelchner ................ G02B 27/62 |
| 2020/0284551 A1* | 9/2020 | Brown .................... F41G 1/473 |

OTHER PUBLICATIONS

European Search report issued in counterpart EP application No. 22831107.2 on Oct. 24, 2024.

* cited by examiner

SYSTEM AND METHOD FOR ELECTRONIC CORRECTION OF BORESIGHT ERRORS IN VARIABLE MAGNIFICATION OPTICAL SYSTEMS

CROSS-REFERENCE TO RELATED APPLICATIONS

The present application claims the benefit of provisional application No. 63/217,308, filed Jul. 1, 2021, the entire contents of which is incorporated herein by reference.

BACKGROUND

Technical Field

The present disclosure is related to optical systems and, in particular, to a system and method for electronic correction of boresight errors in variable magnification optical systems such as rifle scopes and other similar systems.

Discussion of Related Art

When lenses move in a variable magnification optical system, boresight errors may be introduced. In a rifle application for example, a deviation between a gun-barrel orientation and a pointing-device orientation, including a reticle, from a boresight offset specification is termed "boresight error". For example, when a gun-barrel orientation and a pointing-device orientation coincide in elevation, azimuth, and roll angles, the gun-barrel and pointing device include no boresight error.

If a reticle is positioned in front of a magnification changer of the variable magnification optical system, there is no effect on aiming capabilities. Though, if the reticle is positioned behind the magnification changer, aiming error is created between the reticle and the image of the target. For this reason, common practice for variable magnification optical systems demands that the reticle be placed in a first focal plane, that is, in front of the magnification changer. Yet, placing the reticle in a second focal plane, that is, behind the magnification changer, has important advantages, such as maintaining constant size of the reticle pattern when magnification varies, and the lack of need to correct relay for aberrations as a separate unit.

The boresight errors, created by the moving parts within magnification changers, are especially critical for larger magnifications which are used to sight remote targets. This applies for all magnification changers having movable optical lens groups, including both zooms and tumblers. Thus, there is a need to mechanically track induced boresight errors when magnification varies and correct the reticule position.

SUMMARY

In at least one aspect, the application describes a variable magnification optical system with boresight error correction. The system further includes a focusing lens to receive light along an optical axis of the variable magnification optical system, with the focusing lens configured to create an image of a target at a focal plane. The system includes a magnification changer disposed along the optical axis, with the magnification changer including an optomechanical drive system to adjust an optical magnification setting of one or more zoom lenses. The system also includes a light source configured to emit a pilot beam into the magnification changer. The system includes a position sensitive photodetector configured to receive the pilot beam exiting the magnification changer. The system further includes a microdisplay optically conjugate to the focal plane, with the microdisplay configured to impose an image of an electronic reticle on the focal plane based on the position of the pilot beam relative to the position sensitive photodetector.

According to one implementation of the system, a deviation of the one or more zoom lenses in mechanical motion or centration introduces boresight errors, and wherein the position of the pilot beam relative to the position sensitive photodetector differs with boresight errors. According to some implementations of the system, the position of the pilot beam relative to the position sensitive photodetector differs relative to a two-dimensional plane of the position sensitive photodetector. According to some implementations of the system, the position sensitive photodetector is configured to transmit a signal to a decoder, the signal including coordinates of the pilot beam relative the two-dimensional plane of the position sensitive photodetector, the decoder configured to determine a position of the electronic reticle on the microdisplay.

According to one implementation, the system further includes an encoder to determine the optical magnification setting of one or more zoom lenses within the magnification changer. According to some implementations, the system further includes a database including boresight error settings for corresponding optical magnification settings of the magnification changer, wherein a decoder is configured to determine a position of the electronic reticle on the microdisplay based on the boresight error settings.

According to one implementation of the system, the focusing lens is disposed within the magnification changer. According to another implementation, the system further includes an image inverting prism cluster disposed along the optical axis downstream of the magnification changer.

According to one implementation of the system, the magnification changer includes one of the following: tumbler optics, discrete zoom optics, continuous zoom optics, or varifocal optics. According to another implementation of the system, the variable magnification optical system is adapted to function within one or more of the following apparatuses: a firearm, a cell phone, telescope, microscope, or medical imaging device.

According to another aspect, the application describes a method for correcting boresight error in a variable magnification optical system. The method includes focusing, with a focusing lens, light along an optical axis of the variable magnification system to create an image of a target at a focal plane. The method includes emitting, with a light source, a pilot beam into a magnification changer, the magnification changer disposed along the optical axis, the magnification changer including an optomechanical drive system to adjust an optical magnification setting of one or more zoom lenses. The method also includes receiving, with a position sensitive photodetector, the pilot beam exiting the magnification changer. The method further includes determining, with a decoder, a position of an image of an electronic reticle relative to a microdisplay based on a position of the pilot beam relative the position sensitive photodetector. The method includes displaying, with the microdisplay, the image of an electronic reticle, the microdisplay optically conjugate to the focal plane and configured to impose the image of the electronic reticle on the focal plane.

According to one implementation of the method, a deviation of the one or more zoom lenses in mechanical motion or centration introduces boresight errors, and wherein the position of the pilot beam relative to the position sensitive photodetector differs with boresight errors. According to some implementations of the method, the position of the pilot beam relative to the position sensitive photodetector differs relative to a two-dimensional plane of the position sensitive photodetector. According to some implementations of the method, the position sensitive photodetector is configured to transmit a signal to the decoder, the signal including coordinates of the pilot beam relative the two-dimensional plane of the position sensitive photodetector.

According to one implementation, the method further includes determining, with an encoder, the optical magnification setting of one or more zoom lenses within the magnification changer. According to another implementation, the method further includes storing, in a database, boresight error settings for corresponding optical magnification settings of the magnification changer.

According to one implementation of the method, the focusing lens is disposed within the magnification changer. According to another implementation, the magnification changer includes one of the following: tumbler optics, discrete zoom optics, continuous zoom optics, or varifocal optics. According to another implementation, the method further includes operating the variable magnification optical system within one or more of the follow apparatuses: a firearm, telescope, microscope, or medical imaging device.

According to a further aspect, the application describes a variable magnification rifle scope with boresight error correction. The rifle scope includes a focusing lens to receive light along an optical axis of the variable magnification optical system, the focusing lens configured to create an image of a target at a first focal plane. The rifle scope includes a magnification changer disposed along the optical axis, the magnification changer including an optomechanical drive system to adjust an optical magnification setting of one or more zoom lenses, the magnification changer including a second focusing lens to create an image of the first focal plane at a second focal plane. The rifle scope also includes a light source configured to emit a pilot beam into the magnification changer. The rifle scope further includes a position sensitive photodetector configured to receive the pilot beam exiting the magnification changer. The rifle scope also, includes a microdisplay optically conjugate to the first or second teal plane, the microdisplay configured to impose an image of an electronic reticle on the first or second focal plane based on the position of the pilot beam relative to the position sensitive photodetector.

BRIEF DESCRIPTION OF THE DRAWINGS

The present disclosure is further described in the detailed description which follows, in reference to the noted plurality of drawings by way of non-limiting examples of embodiments of the present disclosure, in which like reference numerals represent similar parts throughout the several views of the drawings.

DETAILED DESCRIPTION

Figure 1:
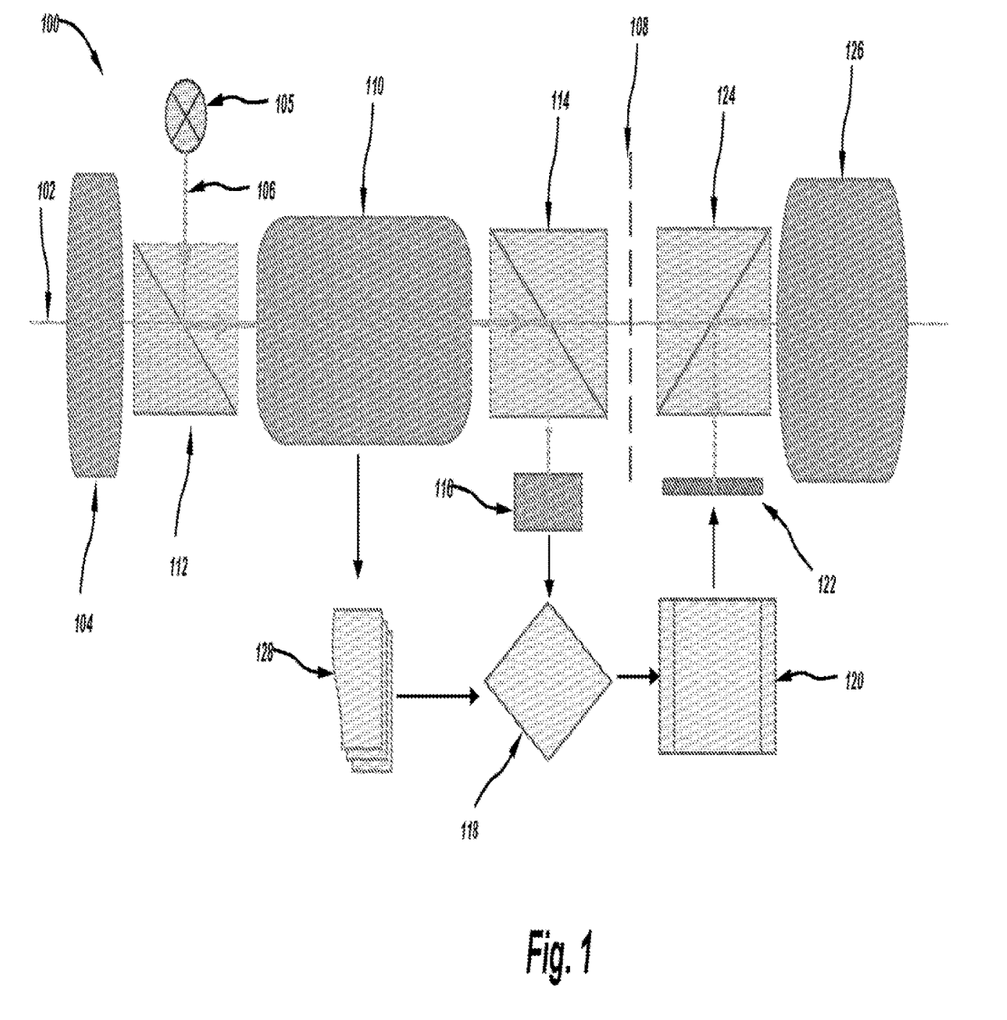
FIG. 1 includes a schematic block diagram of a variable magnification optical system with boresight error correction.

FIG. 1 shows an example variable magnification optical system 100 with boresight error correction. The variable magnification optical system 100 may be used in an optical system, such as a telescopic sight in a firearm, telescope, a microscope, medical imaging device, or the like. The variable magnification optical system may include an optical axis 102, which defines a path through which light propagates within the variable magnification optical system 100. The optical axis 102 may pass through a center of curvature of one or more optical components within the variable magnification optical system 100. The optical axis 102 may coincide with an axis of rotational symmetry of the variable magnification optical system 100.

A focusing lens 104 may be disposed at a first portion of the variable magnification optical system 100 such that it receives light before other optical components within variable magnification optical system 100. In another implementation, the focusing lens 104 may be disposed within a magnification changer 110, as explained below. The focusing lens 104 may be disposed along optical axis 102. The light emanating along the optical axis 102 may be aligned at one or more foci of the focusing lens 104. The focusing lens 104 may include a curved mirror or lens. For example, the focusing lens 104 may include a convex or concave lens. Alternatively, the focusing lens 104 may include a flat mirror or lens, though it should be understood that any lens or mirror may be suitable for implementations described herein.

The focusing lens 104 may be configured to create an image of the target or optical components upstream of variable magnification optical system 100 at a focal plane 108. In this regard, the focusing lens 104 may align parallel, converging, or diverging: light emanating from a target or optical components upstream of variable magnification optical system 100 in a specific direction, such as downstream optical axis 102 and toward a user, such that light emitted from the focusing lens 104 converges as it propagates. The focusing lens 104 may include a converging lens including a positive focal length defined by the distance at which a beam of collimated light from a target or optical components upstream of variable magnification optical system 100 will be focused to a single spot or plane.

In other implementations, the focusing lens 104 may diverge light emitted therefrom as it propagates. The focusing lens 104 may include a diverging lens including a negative local length defined by the distance to the point from which a collimated beam appears to be diverging after passing through the focusing lens 104.

In other implementations the focusing lens 104 may create an image of the target or optical components upstream of variable magnification optical system 100 at infinity. In this regard, light emitted from the focusing lens 104 may include no divergence or convergence. Thus, as the distance light travels from the focusing lens 104 increases, spherical wavefronts of the light may become flatter and closer to plane waves, which may be perfectly collimated. Because parallel light does not converge, the focusing lens 104 in such an example creates an infinite image of the target or optical components upstream of variable magnification optical system 100. It should be understood that the focal length of the focusing lens 104 may vary based on a required collimation, convergence, or divergence.

The variable magnification optical system 100 may include a light source 105 configured to emit a pilot beam 106. The light source 105 may include a coherent light source, such as a laser and/or a laser diode. The light source 105 may be configured to emit a pilot beam 106 invisible to the human eye, such as liar example a near-infrared (NIR) pilot beam 106. For example, the light source 105 may emit light defining the pilot beam 106 including wavelengths varying between 750 nanometers to 2,500 nanometers.

In other implementations light source 105 may include an incoherent or partially coherent light source, such as a light emitting diode. In this regard, the light source 105 may be configured to emit a pilot beam 106 visible to the human eye such as for example a visible light pilot beam 106. For example, light source 105 may emit light defining the pilot beam 106 including wavelengths approximately varying between 600-700 nanometers. Though implementations where light source 105 is configured to emit visible light pilot beam 106 may distract the operator of the variable magnification optical system 100 or obstruct an observed scene or target.

In other implementations, light source 105 may be configured to emit a pilot beam 106 including medium wave infrared (MWIR), long wave infrared (LWIR), ultraviolet waves, or other electromagnetic radiation, like, for example, microwaves (especially THz waves).

The variable magnification optical system 100 may include a magnification changer 110 disposed along the optical axis 102. Diverging or converging light from a direction of a target or upstream variable magnification optical system 100 may be received by the magnification changer 110. The magnification changer 110 may thereafter emit converging light, diverging light, or light with no divergence or convergence. Like the focusing lens 104, the magnification changer 110 may also be configured to create an image of the target or optical components upstream of variable magnification optical system 100 at a focal plane 108. In this regard, the magnification changer 110 may align parallel, converging, or diverging light emanating from a target or optical components upstream of variable magnification optical system 100 in a specific direction, such as downstream optical axis 102 and toward a user, such that light emitted from the magnification changer 110 converges as it propagates. The magnification changer 110 may include a converging lens including a positive focal length defined by the distance at which a beam of collimated light from a target or optical components upstream of variable magnification optical system 100 will be focused to a single spot or plan.

The magnification changer 110 may include one or more lenses or lens systems. For example, the magnification changer 110 may include one or more zoom lenses. The one or more zoom lenses may be disposed on, within, configured with, or otherwise affixed to an optomechanical drive system to adjust an optical magnification setting of the one or more zoom lenses. In this regard, the one or more zoom lenses may be fixed in motion on a rail, track, pole, or similar system. Alternatively, the one or more zoom lenses may be configured for mechanical motion, such as to slide axially along the rail, track, pole, or similar system, controlled manually or with a computer. In another implementation, the one or more zoom lenses may be arranged along a gear and cams system disposed within the magnification changer 110. It should be understood that other optomechanical drive systems may be implemented such as to shift the position of the one or more zoom lenses relative the optical axis 102.

The one or more zoom lenses as described above may include one or more converging or diverging lenses or lens systems. The one or more converging or diverging lenses or lens systems may be disposed along the optical axis 102. The one or more converging or diverging lenses or lens systems may include one or more curved mirrors or lenses such as convex or concave lenses. Alternatively, the one or more converging or diverging lenses or lens systems may include a flat mirror or lens. The one or more converging or diverging lenses or lens systems may align light along the optical axis 102 in a specific direction, such as downstream optical axis 102 away from a target and toward a user. The one or more converging or diverging lenses or lens systems may be disposed toward an exit of the magnification changer 110, such that the one or more afocal zoom elements receive light beforehand.

The one or more zoom lenses as described above may include one or more afocal zoom elements. For example, the zoom lenses may include one or more converging lenses and one or more diverging lens disposed sequentially, the one or more diverging lenses including an absolute focal length equal to that of the one or more converging lenses. When the one or more diverging lenses and one or more converging lenses shifts, the overall angular magnification of the variable magnification optical system 100 varies, changing the effective focal length of the magnification changer 110.

The magnification changer 110 may include an image inverting prism duster. The image inverting prism cluster may revert, invert, rotate, derotate, displace a line of sight, or deviate a line of sight of light propagating therethrough. The image inverting prism cluster may be disposed along the optical axis 102. As such, the image inverting prism cluster may alter light comprising an image of a target or optical components upstream of variable magnification optical system 100.

When the one or more zoom lenses moves in magnification changer 110 along the optomechanical drive system, boresight errors may be introduced. This is because the optomechanical drive system may not adjust the one or more zoom lenses along the optical axis precisely enough. For example, the optomechanical drive system may shift the one or more zoom lenses transverse or perpendicular to the optical axis 102, rotationally around the optical axis 102, or in another unintended fashion. As such, the one or more zoom lenses may experience a deviation in mechanical motion or centration. Ideally, the orientation of a device using the variable magnification optical system 100 and the orientation of the one or more zoom lenses within the magnification changer 110 coincide in elevation, azimuth, and roll angles.

The light source 105 may be configured to emit the pilot beam 106 into the magnification changer 110. In one implementation, the light source 105 may be displaced from the optical axis 102. A first beam splitter 112 may be employed to receive light along the optical axis 102 and also from the light, source 105, such that the pilot beam 106 and light along the optical axis 102 may simultaneously propagate into a first end of the magnification changer 110.

The magnification changer 110 may be disposed between the first beam splitter 112 and a second beam splitter 114. The second beam splitter may direct the pilot beam 106 and light along the optical axis 102 exiting the magnification changer 110 toward a position sensitive photodetector 116. The position sensitive photodetector 116 may include one or more optoelectronic position sensors that utilize photodiode surface resistance to provide continuous position data of the pilot beam 106 exiting the magnification changer 110. The position sensitive photodetector 116 may include a lateral sensor to accurately measure the displacement of the pilot beam 106 incident on the position sensitive photodetector 116 relative to a calibrated center of the position sensitive photodetector 116. The position sensitive photodetector 116 may provide positional information of any spot within the detector region, independent of beam shape, size, and power distribution. The position sensitive photodetector 116 may include a two-dimensional plane such that the position of the pilot beam 106 is relative to a two-dimensional plane of the position sensitive photodetector 116. The position sensitive photodetector 116 may include an isotropic sensor or a two-dimensional tetra-lateral position sensitive device. However, it should be noted that the present illustrative example can refer to a 2D optical position sensing photodetector that can be based on any applicable sensing technology. Examples include quadrant photodiodes, miniature CCD photodetector arrays, and miniature CMOS photodetector arrays.

The position sensitive photodetector 116 may transmit the detected displacement of the pilot beam 106 relative to the calibrated center of the position sensitive photodetector 116 to a decoder 118 through a signal. The signal may also include coordinates of the pilot beam or other locating means relative the two-dimensional plane of the position sensitive photodetector 116. The decoder 118 may be configured to determine data including an appropriate position of an image of an electronic reticle to be imposed by a microdisplay 122 based on the detected displacement of the pilot beam 106 relative to the calibrated center of the position sensitive photodetector 116 to a decoder 118 through a signal. Thereafter the decoder, may transmit the data via a signal to a microdisplay controller 120. It should be noted that the illustrative example assumes referencing to the calibrated center of the 2D position sensitive detector 116. Although this is may be most natural approach, another point can be chosen as a reference; tier example, a center of a microdisplay or a center of a reticle for initial magnification setting. If boresight errors are repeatable rather than random, the correction can be relative from one magnification end to the other. The detector signal can be stored at the initial setting and all motions of the signal can move the reticle on the display relative to the initial reading. The item calibrated can thereby be the microdisplay image.

The microdisplay controller 120 may be integrally combined with a microdisplay 122 and may be configured to operate the microdisplay 122. In this regard, the microdisplay controller 120 may control the microdisplay 122 to impose the image of an electronic reticle, the position of the image of the electronic reticle based on the signal from the decoder 118. As such, the position of the image of the electronic reticle on the microdisplay 122 may be based on position of the pilot beam relative to the position sensitive photodetector 116. For example, where the position of the pilot beam relative to the position sensitive photodetector 116 is off-center, the position of the image of the electronic reticle relative the microdisplay 122 may also be off-center.

The variable magnification optical system 100 may include a database of electronic reticle patterns. The microdisplay controller 170 may be configured to select an electronic reticle from the database and impose the electronic reticle onto the microdisplay 122, as mentioned above, offering an interchangeable and customizable electronic reticle based on data within the database.

The microdisplay 122 may be optically conjugate to the focal plane 108. An optical conjugate may include image or object pairs. Optical elements between conjugates create an imaging relationship such that light which crosses one conjugate will recross at the other conjugate. If a point source is identified at one optical conjugate, an image of that point source may be at the other optical conjugate. Likewise, if a point source identified at a second optical conjugate, an image of the point source may be at the other optical conjugate, Points of light at the first focal plane 108 are also present at the microdisplay 122. In this regard, the microdisplay 122 may include an image of the focal plane 108.

The microdisplay 122 may be positioned on the optical axis 102 or displaced therefrom. A beamsplitter 124 may receive light from the microdisplay 122 and transmit the light to an eyepiece 126. As such, a user may see an image of the focal plane 108 with an image of an electronic reticle imposed thereon, where the position of the electronic reticle relative the microdisplay 122 is based on the position of the pilot beam relative to the position sensitive photodetector 116.

In operation, when the optomechanical drive system of the magnification changer 110 does not adjust the one or more zoom lenses along the optical axis precisely enough, for example, where the one or more zoom lenses experiences a deviation in mechanical motion or centration, the pilot beam 106 may include a displacement incident on the position sensitive photodetector 116 relative to the calibrated center of the position, sensitive photodetector 116. The decoder 118 may determine where an image of an electronic reticle should be displayed on the microdisplay 122. The microdisplay controller 120 may then control the microdisplay 122 to impose an image of an electronic reticle overlayed with an image of the focal plane 108. A user may see the image of the focal plane 108 with a correctly positioned image of an electronic reticle through the eyepiece 126.

The variable magnification optical system 100 may also include, in some implementations, look-up tables 128. The look-up tables 128 may include a computer database storing simulated, predicted, or past experienced boresight error settings based on a given optical magnification setting of the magnification changer 110, the optical magnification settings include the position, elevation, azimuth, and roll angles of one or more zoom lenses. For example, for a given position, elevation, azimuth, and roll angle of the one or more zoom lenses within the magnification changer 110, the look-up tables 128 may include a corresponding boresight error setting and a required electronic reticle position to be imposed by the microdisplay 122.

The magnification changer 110 may include one or more sensors to sense a present position, elevation, azimuth, and roll angle of the one or more zoom lenses within the magnification changer 110. The magnification changer 110 may be in electrical communication with an encoder configured to transmit data including the present position, elevation, azimuth, and roll angle of the one or more zoom lenses to the computer to cross-reference the data with the look-up tables 128. In this regard, the encoder may determine an optical magnification setting of the magnification changer 110 and transmit data including the optical magnification setting to the computer to cross-reference the data with the look-up tables 128 The computer may thereafter transmit data including most probable values of boresight correction for the present position, elevation, azimuth, and roll angle of the one OF more zoom lenses to the decoder. As such, the look-up tables 128, computer, and encoder offer a secondary means to determine an appropriate position of the image of the electronic reticle on the microdisplay 122.

Figure 2:
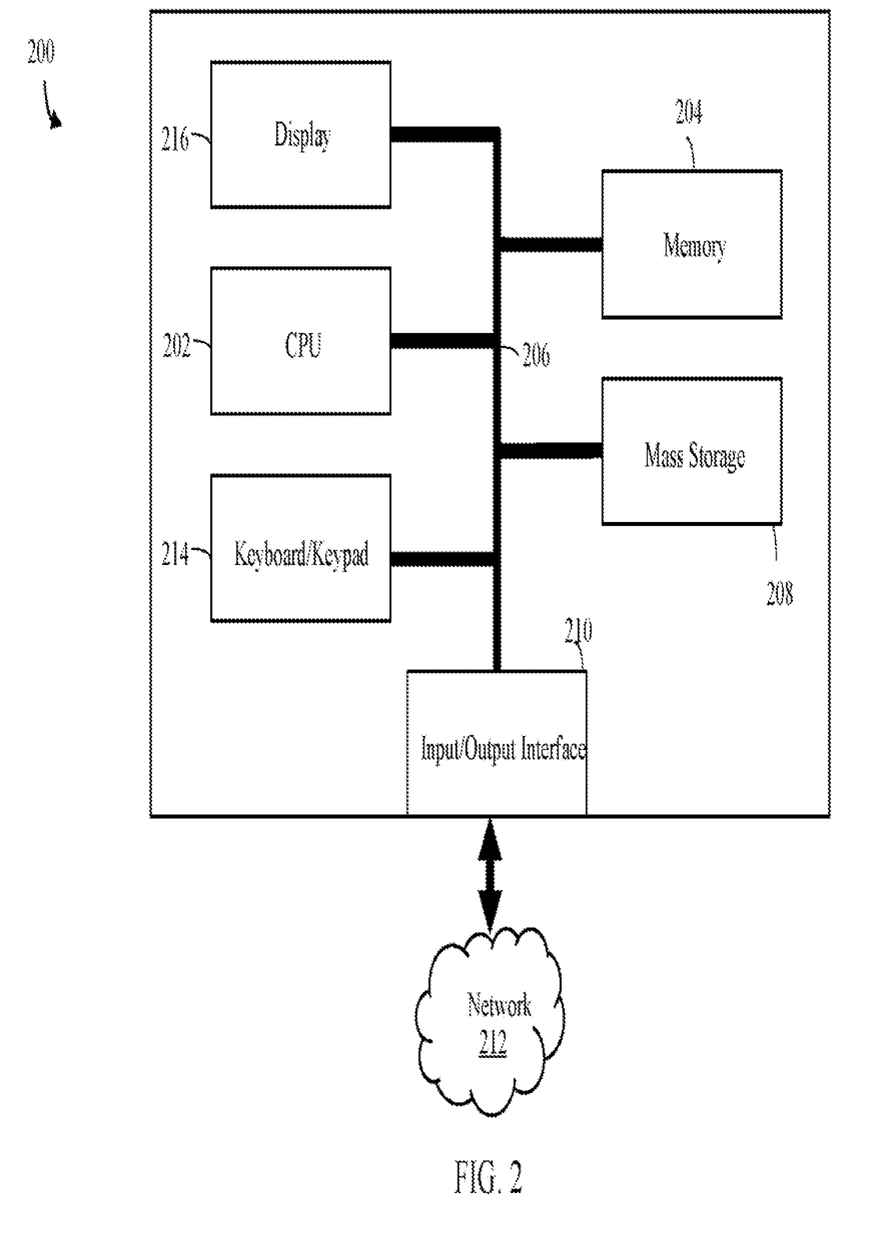
FIG. 2 is a block diagram of a computer system arranged to perform processing associated with the variable magnification optical system of FIGS. 1, 3, 4, and 5.

FIG. 2 is block diagram of a computer system 200 arranged to perform processing associated with the variable magnification optical system 100, 300, 400 and 500. The exemplary computer system 200 includes a central processing unit (CPU) 202, a memory 204, and an interconnect bus 206. The CPU 202 may include a single microprocessor or a plurality of microprocessors or special purpose processors for configuring computer system 200 as a multi processor system. The memory 204 illustratively includes a main memory and a read only memory. The computer 200 also includes the mass storage device 208 having, for example, various disk drives, tape drives, etc. The memory 204 also includes dynamic random access memory (DRAM) and high-speed cache memory. In operation, memory 204 stores at least portions of instructions and data for execution by the CPU 202. The memory 204 may also contain compute elements, such as Deep In-Memory Architectures (DIMA), wherein data is sent to memory and a function of the data (e.g., matrix vector multiplication) is read out by the CPU 202. It should be noted that because portable devices like electronic rifle scope may need to provide instant, real-time operation with high reliability, while using very limited resources and having usually a very restricted electric power budget, computing technologies of interest can also include embedded systems and low-level programming languages (such as, assemblers).

The mass storage 208 may include one or more magnetic disk, optical disk drives, and/or solid state memories, for storing data and instructions for use by the CPU 202. At least one component of the mass storage system 208, preferably in the form of a non-volatile disk drive, solid state, or tape drive, stores the database used for processing data and controlling functions of a variable magnification optical system 100, 300, 400 and 500. The mass storage system 208 may also include one or more drives for various portable media, such as a floppy disk, flash drive, a compact disc read only memory (CD-ROM, DVD, CD-RW, and variants), memory stick, or an integrated circuit non-volatile memory adapter (i.e. PC-MCIA adapter) to input and output data and code to and from the computer system 200.

The computer system 200 may also include one or more input/output interfaces for communications, shown by way of example, as interface 210 and/or a transceiver for data communications via the network 212. The data interface 210 may be a modem, an Ethernet card, or any other suitable data communications device. To provide the functions of an encoder, look up tables 128, microdisplay controller, and database in FIG. 1, the data interface 210 may provide a relatively high-speed link to a network 212, such as an intranet, internet, Aegis network, or the Internet, either directly or through another external interface. The communication link to the network 212 may be, for example, optical, wired, or wireless (e.g., via satellite or cellular network). The computer system 200 may also connect via the data interface 210 and network 212 to at least one other computer system to perform remote or distributed multi-sensor processing related to, for example, a common operational picture (COP). Alternatively, the computer system 200 may include a mainframe or other type of host computer system capable of Web-based communications via the network 212. The computer system 200 may include software for operating a network application such as a web server and/or web client.

The computer system 200 may also include suitable input/output ports, that may interface with a portable data storage device, or use the interconnect bus 206 for interconnection with a local display 216 and keyboard 214 or the like serving as a local user interface for programming and/or data retrieval purposes. The display 216 may include a touch screen capability to enable users to interface with the system 200 by touching portions of the surface of the display 216. Server operations personnel may interact with the system 200 for controlling and/or programming the system from remote terminal devices via the network 212.

The computer system 200 may run a variety of application programs and store associated data in a database amass storage system 208. One or more such applications may include a variable magnification optical system 100, 300, 400 and 500 such as described with respect to FIGS. 1, 3, 4, 5.

The components contained in the computer system 200 may enable the computer system to be used as a server, workstation, personal computer, network terminal, mobile computing device, mobile telephone, System on a Chip (SoC), and the like. As discussed above, the computer system 200 may include one or more applications such as waveform control, streaming cross-correlations, artifact corrections, target acquisitions, and the tracking and discrimination of targets. The system 200 may include software and/or hardware that implements a web server application. The web server application may include software such as HTML, XML, WM L, SGML, PHP (Hypertext Preprocessor), CGI, and like languages.

The foregoing features of the disclosure may be realized as a software component operating in the system 200 where the system 200 includes Unix workstation, a Windows workstation, a LINUX workstation, or other type of workstation. Other operation systems may be employed such as, without limitation, Windows, MAC OS, and LINUX. In some aspects, the software can optionally be implemented as a C language computer program, or a computer program written in any high level language including, without limitation, Javascript, Java, CSS, Python, Keras, TensorFlow, PHP, Ruby, C++, C, Shell, C#, Objective-C, Go, R, TeX, VimL, Perl, Scala, CoffeeScript, Emacs Lisp, Swift, Fortran, or Visual BASIC. Certain script-based programs may be employed such as XMIL, WML, PHP, and so on. The system 200 may use a digital signal processor (DSP).

As stated previously, the mass storage 208 may include a database. The database may be any suitable database system, including the commercially available Microsoft Access database, and can be a local or distributed database system. A database system may implement Sybase and/or a SQL Server. The database may be supported by any suitable persistent data memory, such as a hard disk drive, RAID system, tape drive system, floppy diskette, or any other suitable system. The system 200 may include a database that is integrated with variable magnification optical system 100, 300, 400 and 500, however, it will be understood that, in other implementations, the database and mass storage 208 can be an external element.

In certain implementations, the system 200 may include an Internet browser program and/or be configured operate as a web server. In some configurations, the client and/or web server may be configured to recognize and interpret various network protocols that may be used by a client or server program. Commonly used protocols include Hypertext Transfer Protocol (HTTP), File Transfer Protocol (FTP), Tenet, and Secure Sockets Layer (SSL), and Transport Layer Security (TLS), for example. However, new protocols and revisions of existing protocols may be frequently introduced. Thus, in order to support a new or revised protocol, a new revision of the server and/or client application may be continuously developed and released.

In one implementation, the variable magnification optical system 100, 300, 400 and 500 includes a network-based, e.g., Internet-based, application that may be configured and run on the system 200 and/or any combination of the other components of the variable magnification optical system 100, 300, 400 and 500. The computer system 200 may include a web server running a Web 2.0 application or the like. Web applications running on the variable magnification optical system 100, 300, 400 and 500 may use server-side dynamic content generation mechanisms such, without limitation, Java servlets, CGI. P, or ASP. In certain implementations, mashed content may be generated by a web browser running, for example, client-side scripting including, without limitation, JavaScript and/or applets on a wireless device.

In certain implementations, the variable magnification optical system 100, 300, 400 and 500 or computer system 200 may include applications that employ asynchronous JavaScript+XML (Ajax) and like technologies that use asynchronous loading and content presentation techniques. These techniques may include, without limitation, XHTML and CSS for style presentation, document object model (DOM) API exposed by a web browser, asynchronous data exchange of XML data, and web browser side scripting, e.g., JavaScript. Certain web-based applications and services may utilize web protocols including, without limitation, the services-orientated access protocol (SOAP) and representational state transfer (REST). REST may utilize HTTP with XML.

The variable magnification optical system 100, 300, 400 and 500, computer system 200, or another component of variable magnification optical system 100, 300, 400 and 500 may also provide enhanced security and data encryption. Enhanced security may include access control, biometric authentication, cryptographic authentication, message integrity checking, encryption, digital rights management services, and/or other like security services. The security may include protocols such as IPSEC and IKE. The encryption may include, without limitation, DES, 3DES, AES, RSA, ECC, and any like public key or private key based schemes.

Figure 3:
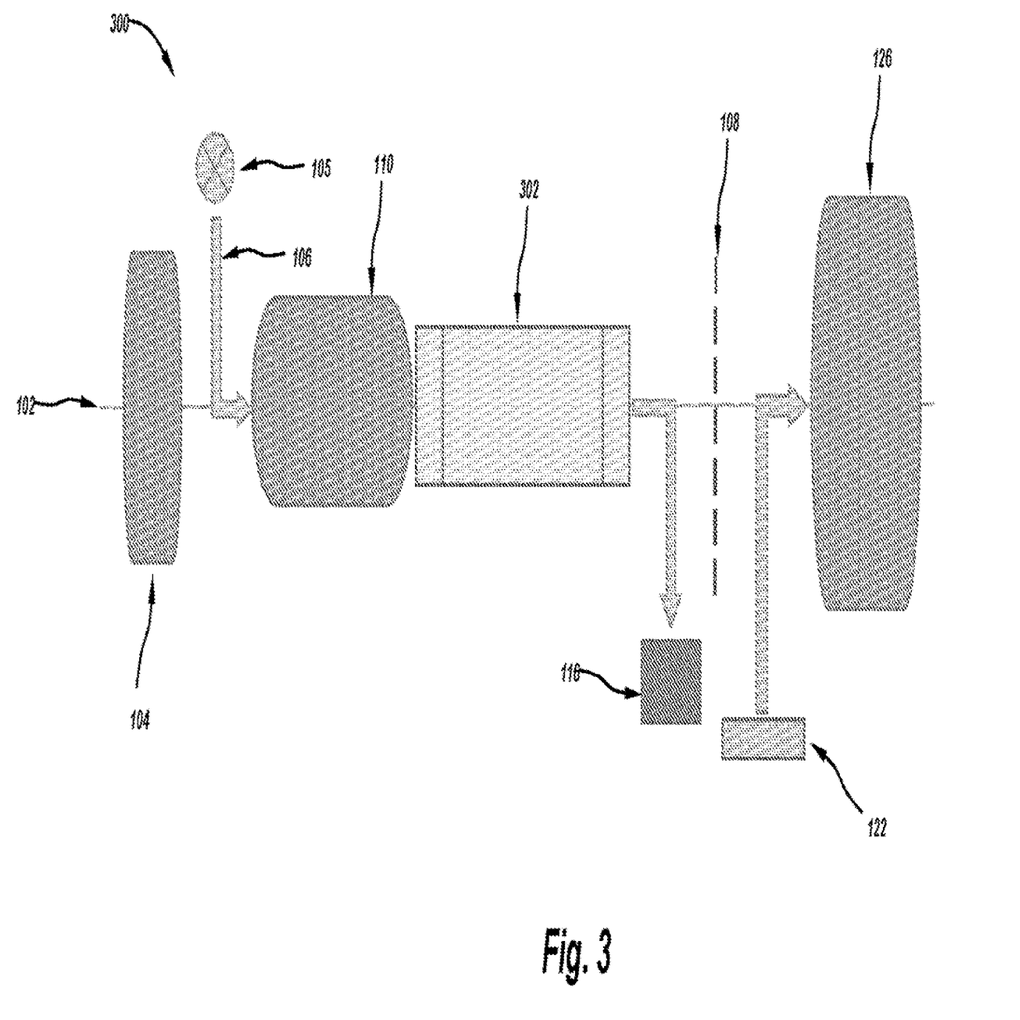
FIG. 3 includes a schematic block diagram of a second implementation of the variable magnification optical system of FIG. 1.

Referring now to FIG. 3, a second implementation of a variable magnification optical system 300 is shown. The variable magnification optical system 300 differs from variable magnification optical system 100 in that an image inverting prism cluster 302 is employed separate from the magnification changer 110. The image inverting prism cluster 302 may revert, invert, rotate, derotate, displace a line of sight, or deviate a line of sight of light propagating therethrough. The image inverting prism cluster 302 may be disposed along the optical axis 102. As such, the image inverting prism cluster 302 may alter light comprising an image of a target or optical components upstream of variable magnification optical system 300.

Figure 4:
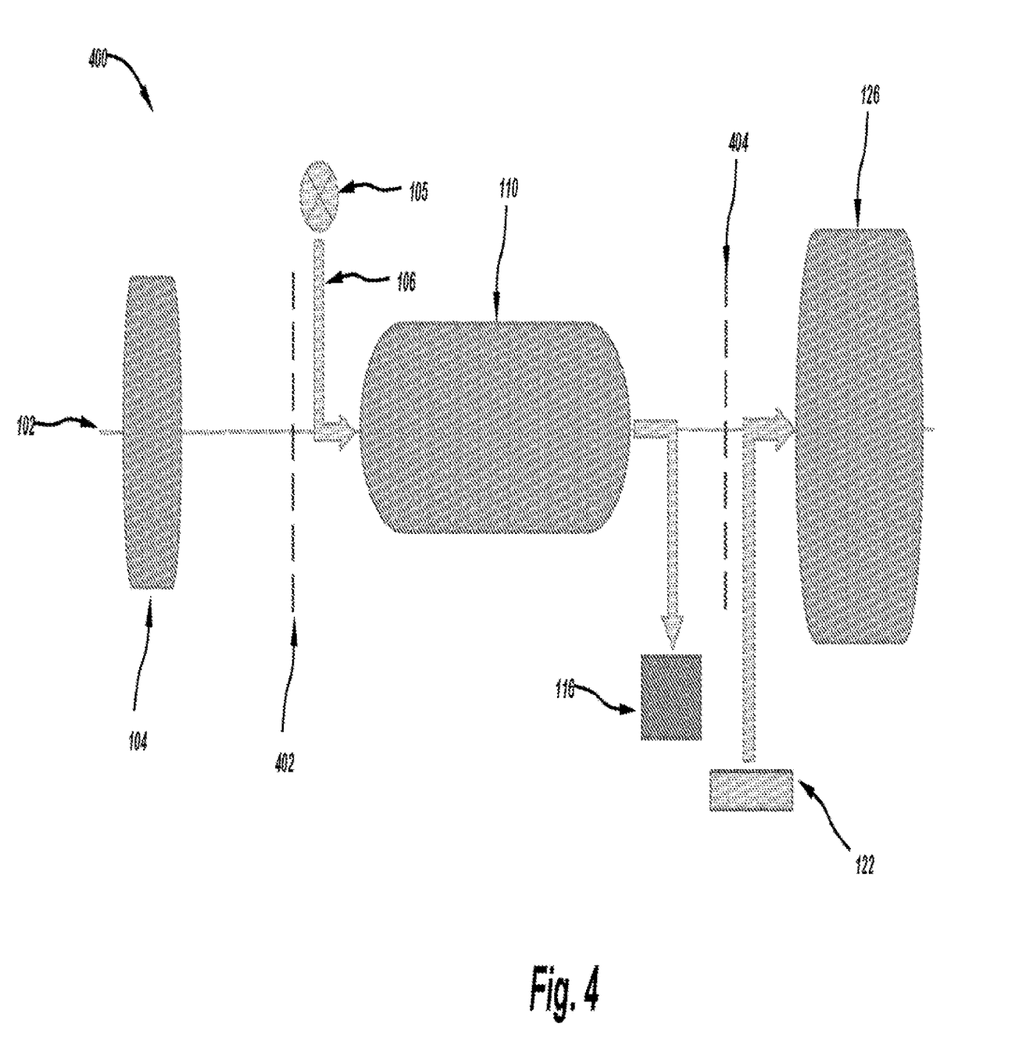
FIG. 4 includes a schematic block diagram of a third implementation of the variable magnification optical system of FIG. 1, the third implementation include two focal planes.

Referring now to FIG. 4, a third implementation of a variable magnification optical system 400 is shown. Variable magnification optical system 400 differs from variable magnification optical system 100 in that variable magnification optical system 400 includes an optical system with a first focal plane 402 and a second focal plane 404 instead of a single focal plane 108. The first focal plane 402 of the variable magnification optical system 400 may be generated by the focusing lens 104 whereas the second focal plane 404 may be generated by the magnification changer 110, or one or more lenses disposed along the optical axis 102. In this way, lens 104 generates first focal plane 402, and then, lens 110 reimages focal plane 402 into second focal plane 404. For example, the focusing lens 104 may generate an image of a target or optical component upstream of variable magnification optical system 400 in the first focal plane 402. The magnification changer 110 may thereafter generate an image of the first focal plane 402 in a second focal plane 404 by using a focusing lens.

In traditional optical systems including two focal planes, a reticle or an image of an electronic reticle must be disposed in the first focal plane 402, that is, before the magnification changer 110. This is because of boresight errors, explained above, generated by the magnification changer 110. For example, where the reticle is disposed in the first focal plane 402, boresight errors equally effect the reticle position and the image of a target or an image of an optical component upstream of variable magnification optical system 400. Spatial relationship between the reticle and, for example, the image of a target is maintained, where the reticle is disposed in the first focal plane 402. Aiming error may be produced with boresight errors where the reticule is disposed in the second focal plane 404 due to lack of spatial relationship between the reticle and, for example, the image of a target.

The present disclosure allows for the reticle to be disposed in the second focal plane 404. This is due to the capability of predicting the boresight error through use of light source 105, pilot beam 106 and position sensitive photodetector 116, or through use of the look-up tables 128, coupled with a microdisplay 122 configured to impose an image of an electronic reticle.

Figure 5:
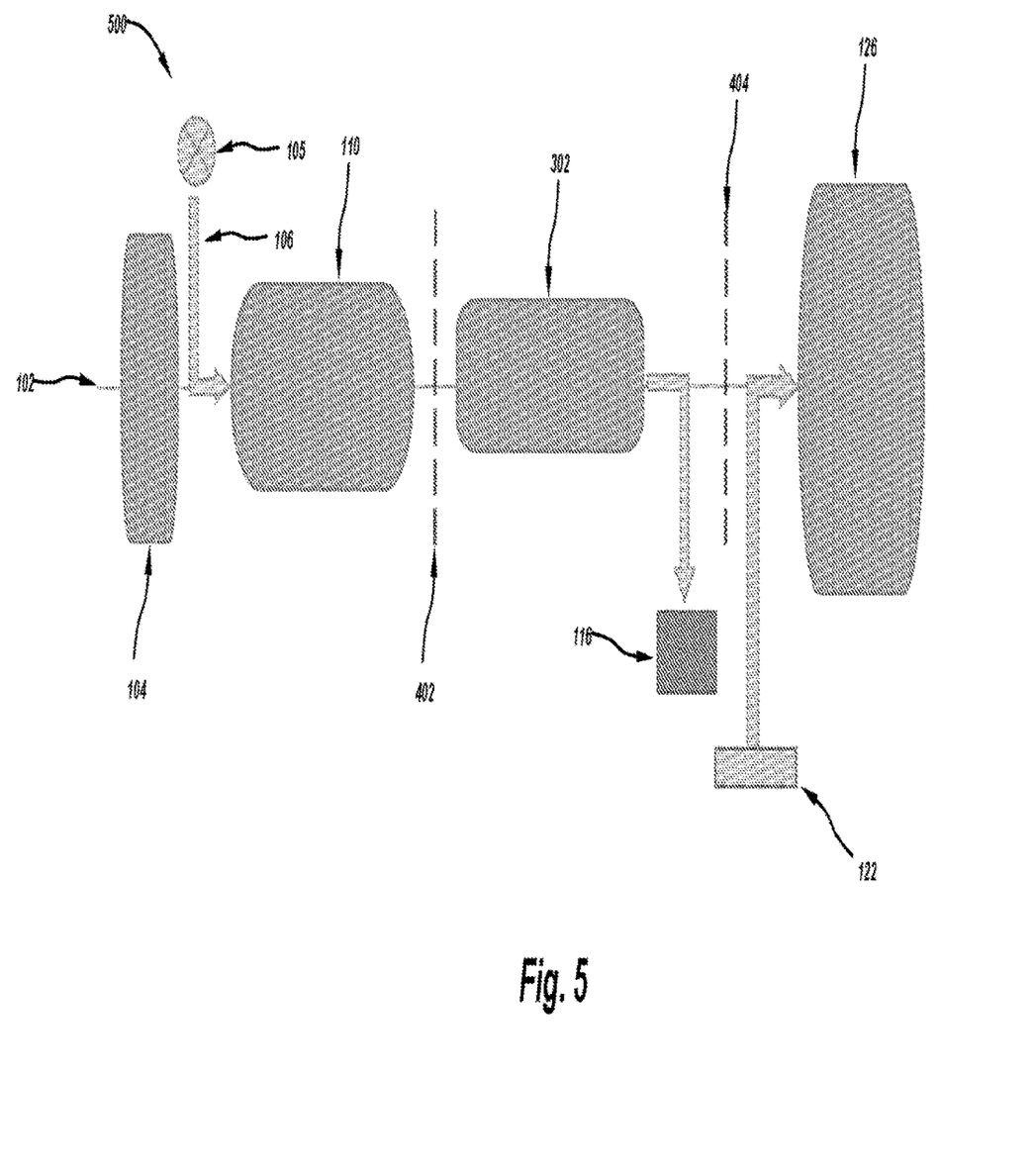
FIG. 5 includes a schematic block diagram of a fourth implementation of the variable magnification optical system of FIG. 1, the fourth implementation including two focal planes.

Referring now to FIG. 5, a fourth implementation of a variable magnification optical system 500 is shown. Variable magnification optical system 500 differs from variable magnification optical system 400 in that the first focal plane 402 is generated by the magnification changer 110. Thereafter, an image inverting relay lens 302 may be employed to reimage the first focal plane 402 into the second focal plane 404.

According to the illustrative example, the image inverting relay lens 302 has constant magnification (no moving lens groups) so that it can always be much shorter than a variable magnification relay. According to the illustrative example, inserting a magnification changer in front of first focal plane 402 does not require extra space, as the objective optics of a telescope (rifle scope) can always have a long focal length, and there can always be sufficient empty space between the objective optics and the first focal plane 402. It should be noted that inserting, a magnification changer in front of a reticle can result in producing boresight errors when changing magnification. So, while the entire scope can be much shorter (which is, a feature which is appreciated by operators of the device) the shooting accuracy will be greatly degraded. Therefore, the present disclosure addresses this problem by monitoring boresight errors and automatically compensating them by properly adjusting reticle position on a microdisplay, offering variable magnification scope which is both compact and precise.

Whereas many alterations and modifications of the disclosure will become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

The invention claimed is:

1. A variable magnification optical system with boresight error correction comprising:
   a focusing lens to receive light along an optical axis of the variable magnification optical system, the focusing lens configured to create an image of a target at a focal plane;
   a magnification changer disposed along the optical axis, the magnification changer including an optomechanical drive system to adjust an optical magnification setting of one or more zoom lenses;
   a light source configured to emit a pilot beam into the magnification changer;
   a position sensitive photodetector configured to receive the pilot beam exiting the magnification changer; and
   a microdisplay optically conjugate to the focal plane, the microdisplay configured to impose an image of an electronic reticle on the focal plane based on the position of the pilot beam relative to the position sensitive photodetector.

2. The variable magnification optical system of claim 1, wherein a deviation of the one or more zoom lenses in mechanical motion or centration introduces boresight errors, and wherein the position of the pilot beam relative to the position sensitive photodetector differs with boresight errors.

3. The variable magnification optical system of claim 2, wherein the position of the pilot beam relative to the position sensitive photodetector differs relative to a two-dimensional plane of the position sensitive photodetector.

4. The variable magnification optical system of claim 3, wherein the position sensitive photodetector is configured to transmit a signal to a decoder, the signal including coordinates of the pilot beam relative the two-dimensional plane of the position sensitive photodetector, the decoder configured to determine a position of the electronic reticle on the microdisplay.

5. The variable magnification optical system of claim 1, further comprising an encoder to determine the optical magnification setting of one or more zoom lenses within the magnification changer.

6. The variable magnification optical system of claim 5, further comprising a database including boresight error settings for corresponding optical magnification settings of the magnification changer, wherein a decoder is configured to determine a position of the electronic reticle on the microdisplay based on the boresight error settings.

7. The variable magnification optical system of claim 1, wherein the focusing lens is disposed within the magnification changer.

8. The variable magnification optical system of claim 1, further comprising an image inverting prism cluster disposed along the optical axis downstream of the magnification changer.

9. The variable magnification optical system of claim 1, wherein the magnification changer includes one of the following: tumbler optics, discrete zoom optics, continuous zoom optics, or varifocal optics.

10. The variable magnification optical system of claim 1, wherein the variable magnification optical system is adapted to function within one or more of the following apparatuses: a firearm, a cell phone, telescope, microscope, or medical imaging device.

11. A variable magnification rifle scope with boresight error correction comprising:
    a focusing lens to receive light along an optical axis of the variable magnification optical system, the focusing lens configured to create an image of a target at a first focal plane;
    a magnification changer disposed along the optical axis, the magnification changer including an optomechanical drive system to adjust an optical magnification setting of one or more zoom lenses, the magnification changer including a second focusing lens to create an image of the first focal plane at a second focal plane;
    a light source configured to emit a pilot beam into the magnification changer;
    a position sensitive photodetector configured to receive the pilot beam exiting the magnification changer; and
    a microdisplay optically conjugate to the first or second focal plane, the microdisplay configured to impose an image of an electronic reticle on the first or second focal plane based on the position of the pilot beam relative to the position sensitive photodetector.

* * * * *